United States Patent

[11] 3,574,391

[72] Inventor Stephen D. Doboze
Lakewood, Ohio
[21] Appl. No. 827,775
[22] Filed May 26, 1969
[45] Patented Apr. 13, 1971
[73] Assignee Scranton Truck Body Equipment Co.

[54] VEHICLE GATE HINGE CONSTRUCTION
10 Claims, 4 Drawing Figs.
[52] U.S. Cl. .................................................. 296/36,
16/158, 49/399, 296/57
[51] Int. Cl. ....................................................... B62d 25/02
[50] Field of Search........................................ 296/50, 57,
36, 10; 49/399; 16/158; 105/378

[56] References Cited
UNITED STATES PATENTS
3,263,370 8/1966 Martinez...................... 49/399X
FOREIGN PATENTS
947,537 1/1964 Great Britain................ 296/14

Primary Examiner—Kenneth H. Betts
Assistant Examiner—John A. Pekar
Attorney—Woodling, Krost, Granger & Rust ABSTRACT: A vehicle gate hinge construction in which a vehicle frame member disposed along the side of the frame is tubular and of rectangular cross section, having at the location where the gate hinge is mounted an open space provided in its upper horizontal wall and an open space provided in its outer vertical wall, the open spaces being contiguous at the juncture of the upper horizontal wall and outer vertical wall, a hinge member having a pintle and a pair of leaf members, the pintle being disposed generally inwardly of the tubular member at the juncture of the upper horizontal wall and outer vertical wall, the first of the leaf members being secured to the upper horizontal wall in said open space therein, and the second of the leaf members being secured to a vehicle gate for swinging of the gate between an upright position and a downward position, the socket for the hinge pintle being disposed in the open space in the outer vertical wall at said juncture between said upper horizontal wall and the outer vertical wall, the second leaf member being offset at a distance from said pintle to extend when disposed uprightly in a plane intermediate the planes of the outer and inward vertical walls of the said frame member.

PATENTED APR 13 1971　　　　　　　　　　　　　　　　　　3,574,391
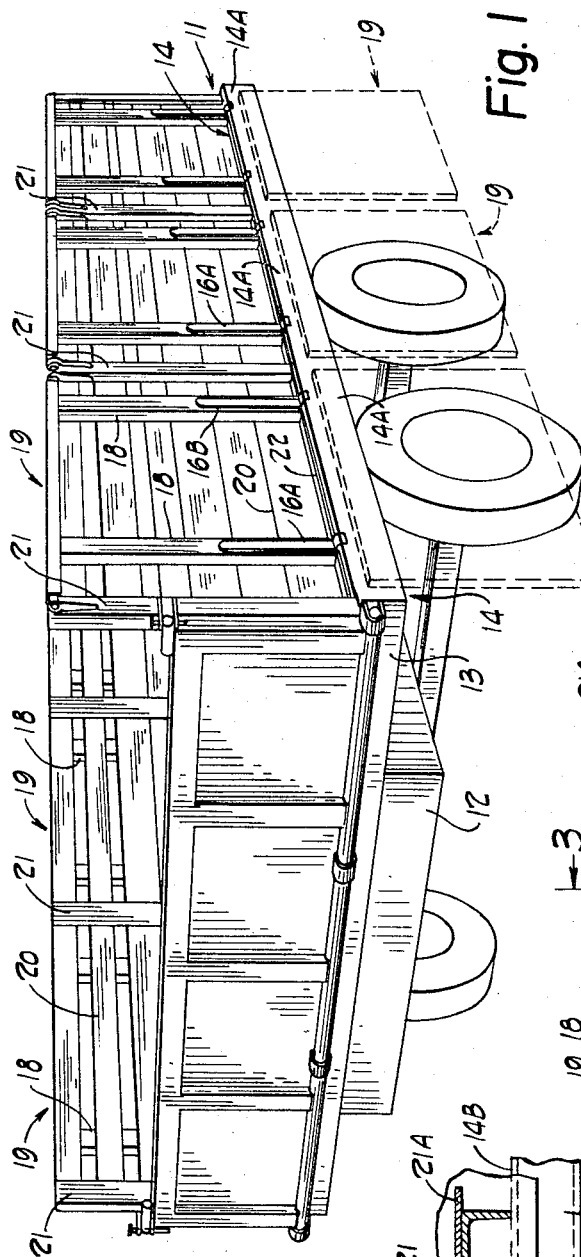
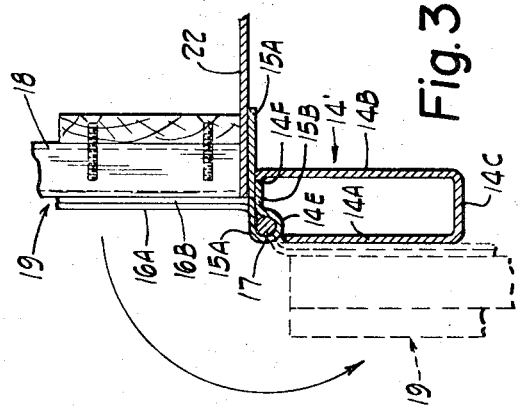
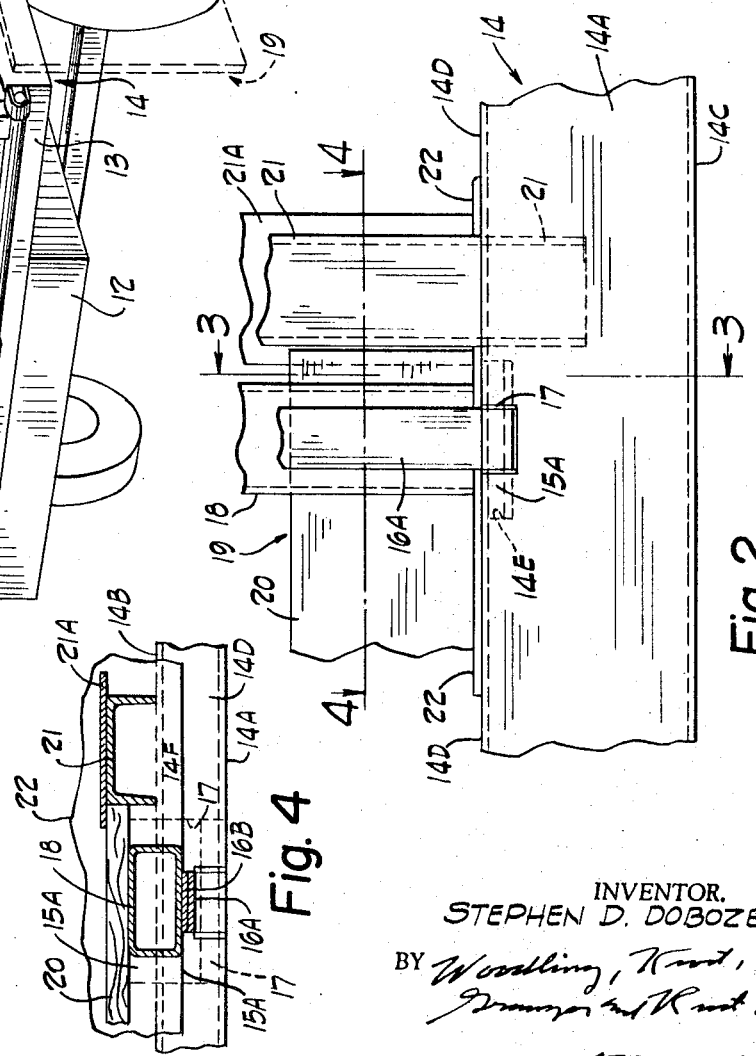
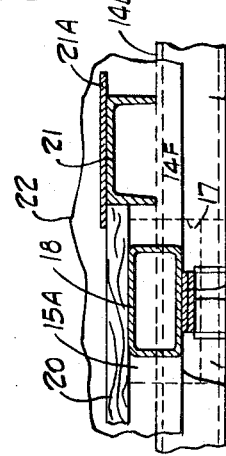
INVENTOR.
STEPHEN D. DOBOZE
BY Woodling, Krost,
Granger and Krost.
ATTORNEYS

VEHICLE GATE HINGE CONSTRUCTION

An object of my invention is to provide an improved hinged construction for a swingable gate of a vehicle body in which the gate is swingable between an upright vertical position and a downward vertical position about the horizontally disposed hinge axis.

Another object is the provision for hingedly connecting a gate to a vehicle so as to provide greater utility, more facile use, and improved efficiency in the same.

Other objects and a fuller understanding of this invention may be had by referring to the following description and claims, taken in conjunction with the accompanying drawings, in which;

FIG. 1 is a perspective view of a truck trailer, shown by way of example, having my improved hinge construction incorporated therein, along the sides thereof and utilizing a plurality of swingable gates mounted with the hinge construction;

FIG. 2 is an enlarged partial view of my new hinged construction on the trailer shown in FIG. 1;

FIG. 3 is a cross-sectional view taken through the line 3—3 of FIG. 2; and

FIG. 4 is a cross-sectional view taken through the line 4—4 of FIG. 2.

The vehicle body to which the preferred form of my invention is applied is, by way of example, shown as a truck trailer. In the drawing, this truck trailer is denoted generally by the reference character 11. The truck trailer 11 has a bed frame of generally rectangular form made up of steel structural members, both transverse and longitudinal. This bed frame is indicated by the reference character 12. The frame 12 has a number of crossbeams 13, one of which is shown in FIG. 1 at the rear of the truck trailer. The frame 12 also includes two longitudinal side beams 14 along the outer longitudinal sides of the frame, these longitudinal side beams 14 being part of the frame and secured to the other parts of the frame by welding and the like in the usual manner.

A typical use of my invention is in providing a hinged connection between the longitudinal side beams 14 of the frame 12 and a plurality of gates shown generally by the reference character 19.

Each gate 19 is made up of a pair of upright members 18. Each gate is independently operable to swing from a vertical position shown in solid lines in FIG. 1 and a vertical downward position shown in broken lines in FIG. 1. The frame 12 has rigidly secured thereto a plurality of upright fixed stakes or members 21 which remain in position. When the gates 19 are in an upright position they abut against portions 21A of the uprights 21 and are thus restrained against swinging inward of the trailer body, that is toward the opposite side of the trailer body. A floor plate 22, of steel, wood or other suitable material, extends across the top of the frame 12 and rests upon the transverse or crossbeams 13 and the longitudinal beams, including the side longitudinal beams 14. At the location of the hinged connections and of the uprights 21 the plate 22 is cut away to accommodate for these.

The longitudinal side beams 14 disposed on the opposite side of the truck trailer are tubular in cross section and preferably made of steel. Each of the two longitudinal side beams 14 has two vertically disposed walls 14A and 14B which are spaced apart. The vertical wall 14A is disposed outwardly of the truck trailer and vertical wall 14B is disposed inwardly of the truck trailer. In other words the walls 14A and 14B are directed toward each other.

Each side beam 15 also has an upper horizontally disposed wall 14D and a lower horizontally disposed wall 14C. It is seen that the extent of the vertical sidewalls is several times that of the horizontal upper and lower walls.

At the location of each hinged connection the outer wall 14A is cut out for a short distance downwardly from the plane of the upper wall 14D, to provide cutout space 14E. Also the upper wall 14D is cut out substantially across its full extent from wall 14A to wall 14B to provide the cut out space 14F. These two cutout spaces 14E and 14F are contiguous and join at the juncture of the vertical wall 14A and the upper horizontal wall 14D.

Disposed at the juncture of the two cutout spaced 14E and 14F and substantially filling these open spaces is a hinge structure which hinge structure has a first hinge leaf member 15 disposed in a horizontal plane. This first hinge leaf member has an upper part 15A and a lower part 15B which together provide a pintle socket. Parts 15A and 15B are integral and the first hinge leaf member is folded back onto itself to form the pintle socket and parts 15A and 15B. Upper part 15A extends in the plane of the upper wall 14D to fill the space 14F and protrudes inwardly of the truck trailer as better seen in FIG. 3. The lower part 15B is disposed within the side beam 14 and extends across to the vertical wall 14B as seen in FIG. 3.

The edge or periphery of the part 15A disposed within the open space 14F of the beam 14 is welded to the edges of the beam 14 around the space 14F. Also the socket portion of the first leaf member 15 is welded to the wall 14A around the edges of the space 14E. Thus the first hinge member 15 together with its socket portion substantially fills the space 14E in the plane of the upper wall 14D and also fills the space 14E in the plane thereof except for the opening necessary for accommodating the second leaf member 16 for its pivotal movement on the pintle 17. The first leaf member 15 in effect becomes a part of the beam 14 and the second leaf member 16 in effect becomes part of the upright member 18 of the gate.

The hinge structure also includes a second hinge leaf member 16 which is a strap of metal folded upon itself to provide the pintle socket and two parts, outer part 16A and inner part 16B secured together. The upright member 18 of the respective gates are secured by screwbolts or other suitable means to the second leaf member 16 at locations spaced from the hinge pintle. A pintle 17 extends through the horizontal openings or bores of the pintle sockets of leaf members 15 and 16. It is to be noted that the second leaf member 16 made up of parts 16A and 16B has an offset portion whereby in the upright position of the second leaf member 16 and of the gate 19 connected thereto the second leaf member 16 is in a vertical plane, as seen in FIG. 3 intermediate of the planes of walls 14A and 14B. This provides that upon the gate 19 being swung to its lowered position, such as shown in broken lines in FIGS. 1 and 3, the second leaf member of the hinge is disposed close to and parallel to the vertical plane of outer wall 14A of the beam 14. Thus each gate may swing downwardly and to vertical planes very close to the outer side of the trailer frame.

It is also to be noted that upon the gates being swung downwardly to their lowered positions the top surface of the floor plate 22 is unobstructed by hinges or parts thereof and there is ready access onto the top surface of the floor plate 22, such as for loading by rolling dollies, hoist trucks, and other such vehicles thereon and also for sliding parts thereon from a loading truck to the bed of the trailer.

The described construction provides a body such as a truck trailer which is very adaptable and suited for loading and unloading loads thereon and providing maximum access thereto. There is a minimum of interference for the movement of loads being moved onto or removed from the truck trailer. It is also found that a very strong hinge construction is provided and which provides for a minimum of interference at the level of the top surface of the floor plate 22. The present disclosure includes that contained in the appended claims, as well as that of the foregoing description.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and scope of the invention as hereinafter claimed.

I claim:

1. In a vehicle body having a generally horizontally disposed bed frame and a gate member hingedly connected adjacent the peripheral edge portion of the bed frame, the improvement of a hinged construction comprising the combination of a generally rectangular tube member disposed along said peripheral edge and forming a portion of said bed frame, first and second opposite walls of the tubular member being disposed generally horizontally with said first wall being positioned uppermost, third and fourth opposite walls of the tubular member being generally disposed substantially normal to said first and second walls, said third wall being directed inwardly of the said bed frame and said fourth wall being directed outwardly of the said bed frame, said tubular member at the juncture of said first wall and fourth wall being cut away to define a first open space in said first wall extending inwardly from said juncture and to define a contiguous open space in said fourth wall extending downwardly from said juncture, said third wall extending downwardly from said juncture, said third wall extending longitudinally continuously at the location of said open space to maintain the integrity and the strength of said rectangular tube member against vertically directed stress at said location, a hinge member having a pintle and a pair of leaf members mounted on said pintle in a hinged construction, a first of said leaf members being secured in the said first open space to said first wall, and said pintle being disposed inwardly of said tubular member adjacent said juncture and extending generally parallel to said tubular member, a second of said leaf members being swingable on said pintle in an arc between an upright position extending upwardly from said first wall and a downward position extending downwardly alongside of, and generally parallel to, said fourth wall, the said second leaf member having secured thereto said gate member on the side of the second leaf member directed inwardly of the vehicle body in the said upright position of the second leaf member and directed outwardly of the vehicle body in the downward position of the second leaf member.

2. The combination claimed in claim 1, and in which said first leaf member is disposed in said first open space to position the upper surface of the first leaf member substantially in the plane of the upper surface of said first wall.

3. The combination as claimed in claim 1, and in which said second leaf member in the region of said pintle is offset from the said pintle to provide that the second leaf member in said upright position extends upwardly from said first wall at a location intermediate of, and substantially parallel to, the planes of said third and fourth walls.

4. The combination as claimed in claim 1 and including a floor plate having a peripheral edge portion positioned an, and supported by, said first wall of the tubular member and said first leaf member, and including said gate member secured to said second leaf member, and including said gate member secured to said second leaf member, the said gate member being spaced along said second leaf member relative to said pintle to provide a space for said peripheral edge portion of the bed plate between the bottom surface of the gate member when disposed in said upright position of the second leaf member and the upper surface of said first wall and of said first leaf member.

5. In a vehicle body having a bed frame and a gate member hingedly connected to the bed frame adjacent a peripheral edge portion of the bed frame, comprising the combination of a frame member of said bed frame disposed along said peripheral edge portion, said frame member having a generally disposed top wall and two generally parallel sidewalls integral with, and depending downwardly from the opposite edges of said top wall, a first of said sidewalls facing inwardly of the bed frame and the second of said sidewalls facing outwardly of the bedframe, said top wall being cut away between said first and second sidewalls at a location along said frame member to define a first open space, said second sidewall being cut away in the region adjoining the juncture of the top wall and second sidewall to define a second open space contiguous with said first open space, a hinge member having a first leaf member, a second leaf member, and a pintle providing a pivot connection between the said leaf members, said leaf members having axially aligned socket portions accommodating said pintler, said first leaf member being disposed generally horizontally and secured to said top wall of frame member, said socket portions of the leaf members being disposed adjacent the juncture of said top wall and said second sidewall and substantially filling said second open space, said second sidewall extending along the frame member below said second open space to retain maximum strength of the frame member in the region of said second open space, the socket portion of said first leaf member being secured to said frame member, the said second leaf member being hingedly swingable on said pintle in an arc between an upright position substantially normal to said frame member and a downward position next adjacent, and generally parallel to, the said second sidewall, said second hinge member, the said second leaf member being adapted to have a gate member secured thereto to be swung therewith in said arc between the said upright and downward positions.

6. The combination as claimed in claim 5 and in which said second leaf member has a gate-securing portion disposed in a plane offset from a parallel plane passing through the axis of said pintle and disposed to extend upwardly from the top wall in a plane intermediate of, and parallel to, the planes of said sidewalls of the frame member upon said first hinge member being in said upright position.

7. The combination as claimed in claim 6 and including a said gate member secured to said gate-securing portion of the second leaf member on the side thereof directed inwardly of said bed frame, the bottom edge of the gate member in the upright position thereof being spaced from the upper surface of said top wall of the frame member to accommodate a bed plate therebetween supported on the frame member.

8. The combination as claimed in claim 5 and in which said first hinge member substantially fills said first open space and has its upper surface disposed substantially flush with the upper surface of said top wall.

9. The combination as claimed in claim 8, and in which the aligned bores of said socket portions of the hinge member are disposed adjacent the juncture of said top wall and said second sidewall, and the axis of said pintle is disposed inwardly of the angle included between the planes coinciding with the outer surfaces of the top wall and second sidewall of the frame member.

10. The combination as claimed in claim 8, and in which said first leaf member is welded to said top wall and the socket portion of the first leaf member is welded to said second sidewall of the frame member.